US012218396B2

(12) United States Patent
Yi et al.

(10) Patent No.: US 12,218,396 B2
(45) Date of Patent: Feb. 4, 2025

(54) MULTI-LAYERED BAND-PASS FILTER DEVICE

(71) Applicant: TDK CORPORATION, Tokyo (JP)

(72) Inventors: Longfei Yi, Tokyo (JP); Shigemitsu Tomaki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 225 days.

(21) Appl. No.: 17/979,884

(22) Filed: Nov. 3, 2022

(65) Prior Publication Data

US 2023/0143899 A1 May 11, 2023

(30) Foreign Application Priority Data

Nov. 10, 2021 (JP) ................................ 2021-183135

(51) Int. Cl.
*H01P 1/203* (2006.01)
*H01P 7/08* (2006.01)

(52) U.S. Cl.
CPC ...... *H01P 1/20309* (2013.01); *H01P 1/20372* (2013.01); *H01P 7/08* (2013.01)

(58) Field of Classification Search
CPC .. H01P 1/20345; H01P 1/20381; H01P 1/203; H01P 1/20; H01P 1/20309; H01P 1/20372; H01P 1/2056; H01P 1/20327; H01P 1/2039; H01P 1/2088; H01P 5/184; H01P 5/185; H01P 7/082; H03H 2001/0085; H03H 7/0138; H03H 7/0161; H03H 7/0123; H03H 7/0115; H03H 1/00; H03H 7/09
See application file for complete search history.

(56) References Cited

U.S. PATENT DOCUMENTS

2003/0184407 A1 10/2003 Tsunoda et al.
2014/0232482 A1 8/2014 Wada et al.
2019/0007018 A1* 1/2019 Ashida ................. H03H 7/0138
2020/0106148 A1* 4/2020 Ashida ................ H01P 1/20381
2020/0194856 A1* 6/2020 Sekiya .................... H01P 7/105

FOREIGN PATENT DOCUMENTS

JP 2007-243462 A 9/2007
JP 2011-119841 A 6/2011

* cited by examiner

*Primary Examiner* — Lincoln D Donovan
*Assistant Examiner* — Tyler J Pereny
(74) *Attorney, Agent, or Firm* — Oliff PLC

(57) ABSTRACT

A filter includes first and second resonators and first and second stub resonators. Each of the first and second resonators includes a first conductor part and a second conductor part electrically connected to the first conductor part and having an impedance smaller than an impedance of the first conductor part. The first stub resonator is electrically connected to the first conductor part of the first resonator. The second stub resonator is electrically connected to the first conductor part of the second resonator. The shape of the first stub resonator and the shape of the second stub resonator are different from each other.

14 Claims, 15 Drawing Sheets

MULTI-LAYERED BAND-PASS FILTER DEVICE

BACKGROUND OF THE INVENTION

1. Field of the Invention

The present invention relates to a filter including a resonator constituted of a distributed constant line.

2. Description of the Related Art

One of electronic components used in a communication apparatus is a band-pass filter including a plurality of resonators. Each of the plurality of resonators is constituted of, for example, a distributed constant line. The distributed constant line is configured to have a predetermined line length.

An example of a resonator configured of such a distributed constant line is a stub resonator. For example, US 2003/0184407 A1 describes a technique in which stub elements are used as a means to adjust the directivity and the coupling degree. JP 2011-119841 A describes a technique in which an open-ended stub is used as a means to reduce spurious components in higher-order resonance frequencies.

A band-pass filter is required to have a large absolute value of attenuation (hereinafter also referred to as pass attenuation) on a high-frequency side of a passband in some cases. To achieve this, spurious components to be generated on the high-frequency side of the passband needs to be controlled.

Provision of communication services using fifth-generation mobile communication systems (hereinafter referred to as 5G) is currently being started. For 5G, the use of frequency bands of 10 GHz or higher, particularly a quasi-millimeter wave band of 10 GHz to 30 GHz and a millimeter wave band of 30 GHz to 300 GHz, is assumed. When frequency bands that are higher and wider than those in a conventional art are used as described above, band-pass filters are also required to satisfy their characteristics in such frequency bands, which are higher and wider than those in a conventional art. However, it is difficult to obtain sufficient characteristics in a related art.

SUMMARY OF THE INVENTION

An object of the present invention is to provide a filter that can increase pass attenuation in a wide frequency band on a high-frequency side of a passband.

A filter of the present invention includes: a first resonator and a second resonator each including a first conductor part and a second conductor part having an impedance smaller than an impedance of the first conductor part; a first stub resonator composed of a distributed constant line and electrically connected to the first conductor part of the first resonator; and a second stub resonator composed of a distributed constant line and electrically connected to the first conductor part of the second resonator. The shape of the first stub resonator and a shape of the second stub resonator are different from each other.

In the filter of the present invention, a length of the first stub resonator and the length of the second stub resonator may be different from each other.

In the filter of the present invention, each of the first conductor part and the second conductor part may be a distributed constant line.

The filter of the present invention may be a band-pass filter that selectively allows a signal of a frequency in a predetermined passband to pass. In this case, the first conductor part of the first resonator may include a first connecting part to which the first stub resonator is connected and a first non-connecting part other than the first connecting part. The first conductor part of the second resonator may include a second connecting part to which the second stub resonator is connected and a second non-connecting part other than the second connecting part. The current density of the first connecting part in a center frequency of the passband may be higher than the current density of the first non-connecting part in the center frequency of the passband. The current density of the second connecting part in the center frequency of the passband may be higher than the current density of the second non-connecting part in the center frequency of the passband.

In the filter of the present invention, an impedance ratio being a ratio of an impedance of the second conductor part to an impedance of the first conductor part in each of the first resonator and the second resonator may be 0.3 or smaller.

In the filter of the present invention, each of the first conductor part of the first resonator and the first conductor part of the second resonator may include a plurality of portions extending in a plurality of directions different from each other.

The filter of the present invention may further include a stack including a plurality of dielectric layers stacked together. The first resonator, the second resonator, the first stub resonator, and the second stub resonator may be integrated with the stack. In this case, the first conductor part and the second conductor part may be arranged at positions different from each other in a stacking direction of the plurality of dielectric layers and electrically connected to each other in each of the first resonator and the second resonator. The filter of the present invention may further include a plurality of through holes connecting the first conductor part and the second conductor part of each of the first resonator and the second resonator. The first conductor part of the first resonator and the first conductor part of the second resonator may be arranged at a same position in the stacking direction. The second conductor part of the first resonator and the second conductor part of the second resonator may be arranged at the same position in the stacking direction.

The filter of the present invention may further include a third resonator arranged between the first resonator and the second resonator in a circuit configuration. In this case, the third resonator may include a third conductor part and a fourth conductor part having an impedance smaller than an impedance of the third conductor part. The third conductor part may have an asymmetrical shape.

The filter of the present invention includes a first stub resonator electrically connected to the first conductor part of the first resonator, and a second stub resonator electrically connected to the first conductor part of the second resonator. The shape of the first stub resonator and the shape of the second stub resonator are different from each other. With this configuration, according to the present invention, it is possible to provide a filter that can increase pass attenuation in a wide frequency band on a high-frequency side of a passband.

Other and further objects, features, and advantages of the present invention will appear more fully from the following description.

DETAILED DESCRIPTION OF THE PREFERRED EMBODIMENTS

First Embodiment

Figure 1:
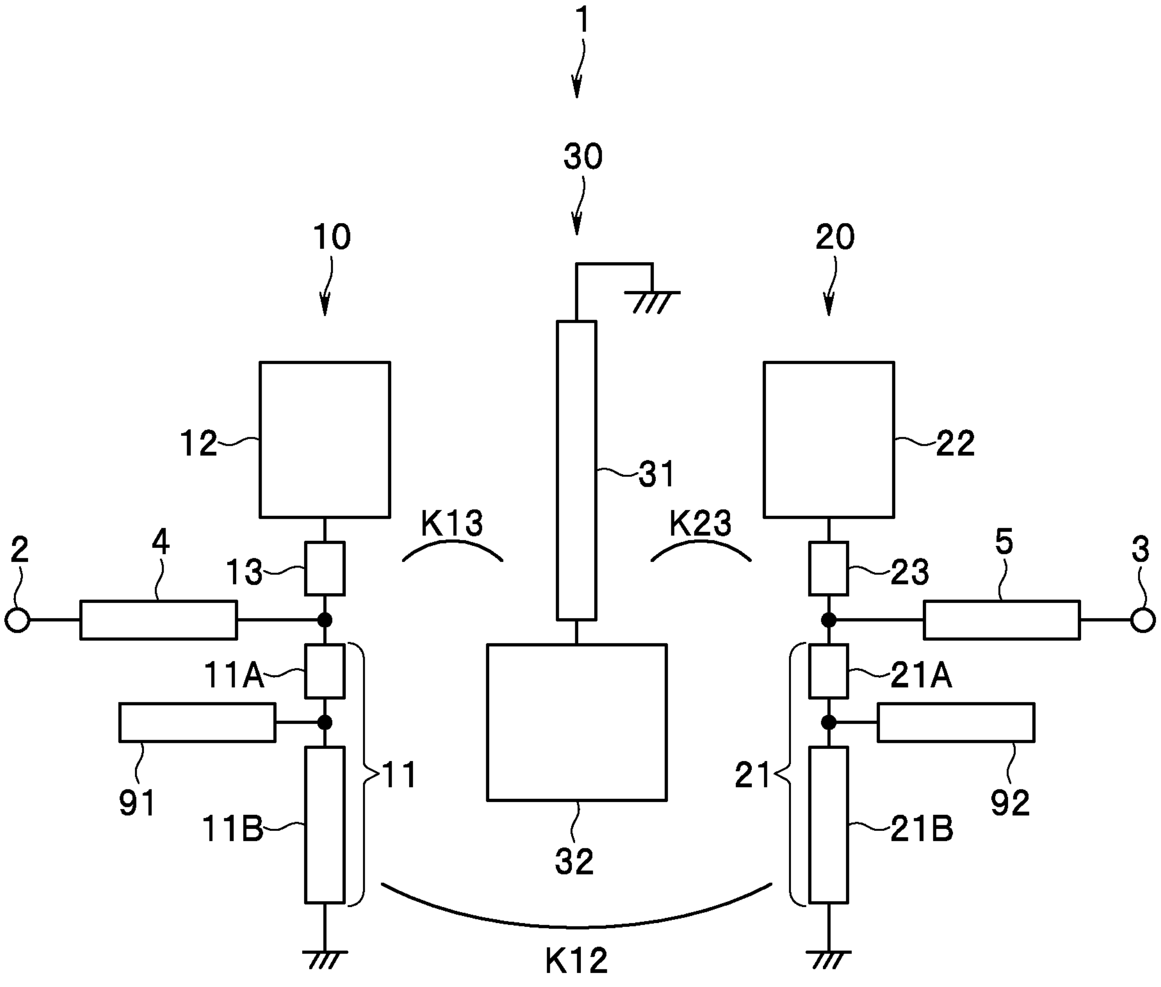
FIG. 1 is a circuit diagram showing a circuit configuration of a filter according to a first embodiment of the present invention.

Embodiments of the present invention will now be described in detail with reference to the drawings. First, reference is made to FIG. 1 to describe a configuration of a filter 1 according to a first embodiment of the present invention. FIG. 1 is a circuit diagram showing a circuit configuration of the filter 1. The filter 1 is configured to function as a band-pass filter that selectively allows a signal of a frequency in a predetermined passband to pass.

The filter 1 according to the present embodiment includes a first resonator 10, a second resonator 20, and a third resonator 30 arranged between the first resonator 10 and the second resonator 20 in a circuit configuration. In the present application, the expression of "in the (a) circuit configuration" is used not to indicate a layout in physical configuration but to indicate a layout in a circuit diagram.

The first to third resonators 10, 20, and 30 are configured so that the first resonator 10 and the third resonator 30 are adjacent to each other in the circuit configuration to be electromagnetically coupled to each other, and the second resonator 20 and the third resonator 30 are adjacent to each other in the circuit configuration to be electromagnetically coupled to each other. In FIG. 1, a curve with a sign K13 represents an electric field coupling between the first resonator 10 and the third resonator 30, and a curve with a sign K23 represents an electric field coupling between the second resonator 20 and the third resonator 30.

The first resonator 10 is magnetically coupled to the second resonator 20 not adjacent to the first resonator 10 in the circuit configuration. Such electromagnetic-field coupling between two resonators not adjacent to each other in the circuit configuration is referred to as cross coupling. In FIG. 1, a curve with a sign K12 represents a magnetic field coupling between the first resonator 10 and the second resonator 20.

The first resonator 10 includes a first conductor part 11 and a second conductor part 12 having an impedance smaller than that of the first conductor part 11. The first conductor part 11 and the second conductor part 12 are electrically connected to each other. The first conductor part 11 is connected to ground. Each of the first conductor part 11 and the second conductor part 12 is a distributed constant line. In particular, in the present embodiment, the first conductor part 11 is a distributed constant line having a small width, and the second conductor part 12 is a distributed constant line having a width larger than that of the first conductor part 11.

The first resonator 10 further includes a third conductor part 13 electrically connecting the first conductor part 11 and the second conductor part 12. The third conductor part 13 may include a distributed constant line having a width smaller than that of the distributed constant line constituting the second conductor part 12. The width of the distributed constant line of the third conductor part 13 may be the same as or different from the width of the distributed constant line constituting the first conductor part 11.

A configuration of the second resonator 20 is basically the same as the configuration of the first resonator 10. Specifically, the second resonator 20 includes a first conductor part 21 and a second conductor part 22 having an impedance smaller than that of the first conductor part 21. The first conductor part 21 and the second conductor part 22 are electrically connected to each other. The first conductor part 21 is connected to ground. Each of the first conductor part 21 and the second conductor part 22 is a distributed constant line. In particular, in the present embodiment, the first conductor part 21 is a distributed constant line having a small width, and the second conductor part 22 is a distributed constant line having a width larger than that of the first conductor part 21.

The second resonator 20 further includes a third conductor part 23 electrically connecting the first conductor part 21 and the second conductor part 22. The third conductor part 23 may include a distributed constant line having a width smaller than that of the distributed constant line constituting the second conductor part 22. The width of the distributed constant line of the third conductor part 23 may be the same as or different from the width of the distributed constant line constituting the first conductor part 21.

The third resonator 30 includes a first conductor part 31 and a second conductor part 32 having an impedance smaller than that of the first conductor part 31. The first conductor part 31 corresponds to a "third conductor part" of the present invention, and the second conductor part 32 corresponds to a "fourth conductor part" of the present invention. The first conductor part 31 and the second conductor part 32 are electrically connected to each other. The first conductor part 31 is connected to ground. Each of the first conductor part 31 and the second conductor part 32 is a distributed constant line. In particular, in the present embodiment, the first conductor part 31 is a distributed constant line having a small width, and the second conductor part 32 is a distributed constant line having a width larger than that of the first conductor part 31.

All the first to third resonators 10, 20, and 30 are each a stepped-impedance resonator composed of a distributed constant line having a small width and a distributed constant line having a large width. All the first to third resonators 10, 20, and 30 are each a quarter-wavelength resonator with one end being short-circuited and the other end being open.

The impedance of each of the first conductor parts 11, 21, and 31 is within a range from 150 to 350, for example. The impedance of each of the second conductor parts 12, 22, and 32 is within a range from 10 to 50, for example. Here, the ratio of the impedance of the second conductor part to the impedance of the first conductor part in each of the first to third resonators 10, 20, and 30 is referred to as an impedance ratio. In each of the first to third resonators 10, 20, and 30, the impedance ratio is smaller than 1.

From an aspect of making the resonators small, the impedance ratio is preferably small. For example, by adjusting the widths of the distributed constant line configuring the first conductor part and the distributed constant line configuring the second conductor part, the impedance ratio can be adjusted. For a smaller impedance ratio, the width of the distributed constant line configuring the first conductor part is relatively small, and the width of the distributed constant line configuring the second conductor part is relatively large.

In particular, in the present embodiment, in each of the first to third resonators 10, 20, and 30, the impedance ratio is 0.3 or smaller. In one example, the impedance of the second conductor part of each of the first and second resonators 10 and 20 is 2.870, and the impedance of the first conductor part of each of the first and second resonators 10 and 20 is 270. In this case, the impedance ratio in each of the first and second resonators 10 and 20 is 0.106. In one example, the impedance of the second conductor part 32 of the third resonator 30 is 2.550, and the impedance of the first conductor part 31 of the third resonator 30 is 270. In this case, the impedance ratio in the third resonator 30 is 0.094.

When the impedance ratio is made too small, desired characteristics are not obtained in some cases. For example, when the impedance ratio is made too small in a stepped-impedance resonator (quarter-wavelength resonator) with one end being short-circuited and the other end being open, this resonator serves substantially as a half-wavelength resonator composed only of a second conductor part with both ends being open. Consequently, desired characteristics cannot be obtained. To prevent this, in the present embodiment, the impedance ratio in each of the first to third resonators 10, 20, and 30 is 0.06 or greater.

The filter 1 further includes a first port 2, a second port 3, and conductor portions 4 and 5. The first to third resonators 10, 20, and 30 are arranged between the first port 2 and the second port 3 in the circuit configuration.

The conductor portion 4 electrically connects the first port 2 and the first resonator 10. The conductor portion 4 is connected, at one end thereof, to the first port 2. The conductor portion 4 is connected, at the other end thereof, to the first resonator 10 between the first conductor part 11 and the third conductor part 13.

The conductor portion 5 electrically connects the second port 3 and the second resonator 20. The conductor portion 5 is connected, at one end thereof, to the second port 3. The conductor portion 5 is connected, at the other end thereof, to the second resonator 20 between the first conductor part 21 and the third conductor part 23.

The filter 1 further includes a first stub resonator 91 electrically connected to the first conductor part 11 of the first resonator 10, and a second stub resonator 92 electrically connected to the first conductor part 21 of the second resonator 20. Each of the first and second stub resonators 91 and 92 is a distributed constant line.

The first stub resonator 91 is connected in the middle of the first conductor part 11. In FIG. 1, for the first conductor part 11, a portion located between a connecting point with the first stub resonator 91 and the second conductor part 12 in a circuit configuration is indicated by a reference numeral 11A, and a portion located between the connecting point with the first stub resonator 91 and the ground in the circuit configuration is indicated by a reference numeral 11B.

The second stub resonator 92 is connected in the middle of the first conductor part 21. In FIG. 1, for the first conductor part 21, a portion located between a connecting point with the second stub resonator 92 and the second conductor part 22 in the circuit configuration is indicated by a reference numeral 21A, and a portion located between a connecting point with the second stub resonator 92 and the ground in the circuit configuration is indicated by a reference numeral 21B.

As will be described later, the shape of the first stub resonator 91 and the shape of the second stub resonator 92 are different from each other. In particular, in the present embodiment, the length of the first stub resonator 91 and the length of the second stub resonator 92 are different from each other.

Each of the first and second stub resonators 91 and 92 may be an open stub with one end being open or may be a short stub with one end being connected to ground. FIG. 1 shows an example in which each of the first and second stub resonators 91 and 92 is an open stub.

Figure 2:
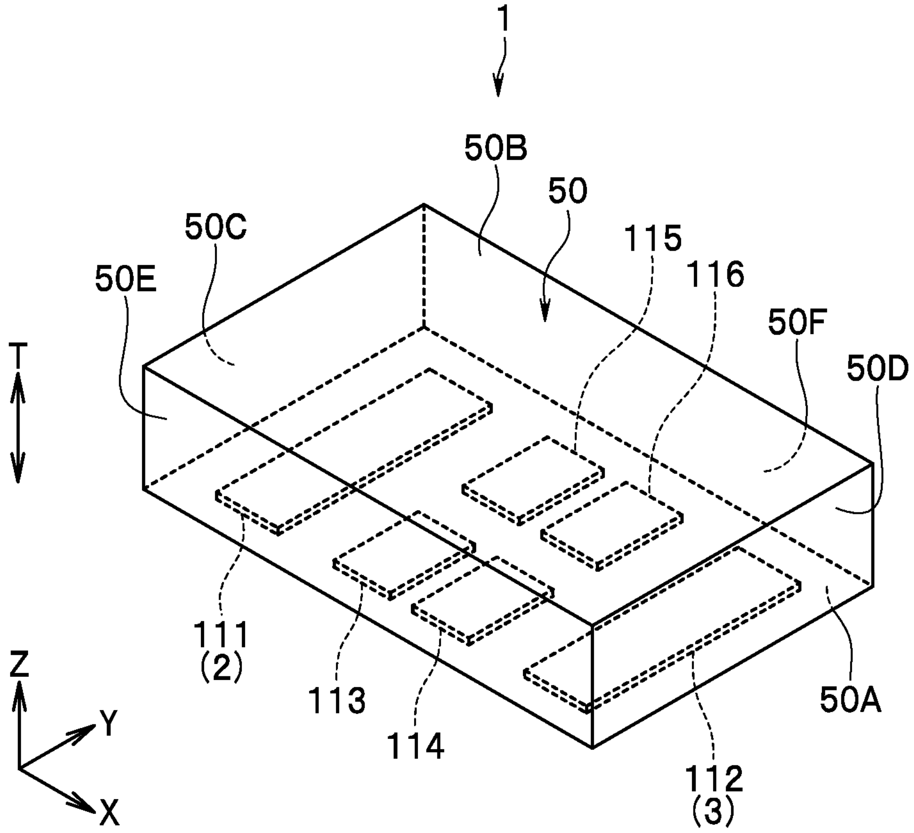
FIG. 2 is a perspective view showing an external appearance of the filter according to the first embodiment of the present invention.

Next, other configurations of the filter 1 will be described with reference to FIG. 2. FIG. 2 is a perspective view showing an external appearance of the filter 1.

The filter 1 further includes a stack 50. The stack 50 includes a plurality of dielectric layers stacked together and a plurality of conductor layers and a plurality of through holes formed in the plurality of dielectric layers. The first to third resonators 10, 20, and 30 and the first and second stub resonators 91 and 92 are integrated with the stack 50. The first to third resonators 10, 20, and 30 and the first and second stub resonators 91 and 92 are formed by using the plurality of conductor layers.

The stack 50 has a first surface 50A and a second surface 50B located at both ends in a stacking direction T of the plurality of dielectric layers, and four side surfaces 50C to 50F connecting the first surface 50A and the second surface 50B. The side surfaces 50C and 50D are opposite to each other. The side surfaces 50E and 50F are opposite to each other. The side surfaces 50C to 50F are perpendicular to the first surface 50A and the second surface 50B.

Here, X, Y, and Z directions are defined as shown in FIG. 2. The X, Y, and Z directions are orthogonal to one another. In the present embodiment, a direction parallel to the stacking direction T will be referred to as the Z direction. The opposite directions to the X, Y, and Z directions are defined as −X, −Y, and −Z directions, respectively.

As shown in FIG. 2, the first surface 50A is located at the end of the stack 50 in the −Z direction. The first surface 50A is also the bottom surface of the stack 50. The second surface 50B is located at the end of the stack 50 in the Z direction. The second surface 50B is also the top surface of the stack 50. The side surface 50C is located at the end of the stack 50 in the −X direction. The side surface 50D is located at the end of the stack 50 in the X direction. The side surface 50E is located at the end of the stack 50 in the −Y direction. The side surface 50F is located at the end of the stack 50 in the Y direction.

The plane shape of the stack 50 when seen in the Z direction, i.e., the shape of the first surface 50A or the second surface 50B, is long in one direction. In particular, in the present embodiment, the plane shape of the stack 50 when seen in the Z direction is a rectangular shape that is long in a direction parallel to the X direction.

The filter 1 further includes a plurality of terminals 111, 112, 113, 114, 115, and 116 provided on the first surface 50A of the stack 50. The terminal 111 extends in the Y direction near the side surface 50C. The terminal 112 extends in the Y direction near the side surface 50D. The terminals 113 to 116 are arranged between the terminal 111 and the terminal 112. The terminals 113 and 114 are arranged in this order near the side surface 50E in the X direction. The terminals 115 and 116 are arranged in this order near the side surface 50F in the X direction.

The terminal 111 corresponds to the first port 2, and the terminal 112 corresponds to the second port 3. Thus, the first and second ports 2 and 3 are provided on the first surface 50A of the stack 50. The terminals 113 to 116 are connected to ground. Hereinafter, the terminal 111 is also referred to as a first terminal 111, the terminal 112 is also referred to as a second terminal 112, and the terminals 113 to 116 are also referred to as ground terminals 113 to 116.

Next, an example of the plurality of dielectric layers and the plurality of conductor layers constituting the stack 50 will be described with reference to FIG. 3A to FIG. 5C. In this example, the stack 50 includes nine dielectric layers stacked together. The nine dielectric layers will be referred to as a first to a ninth dielectric layer in the order from bottom to top. The first to ninth dielectric layers are denoted by reference numerals 51 to 59, respectively.

Figure 3A:
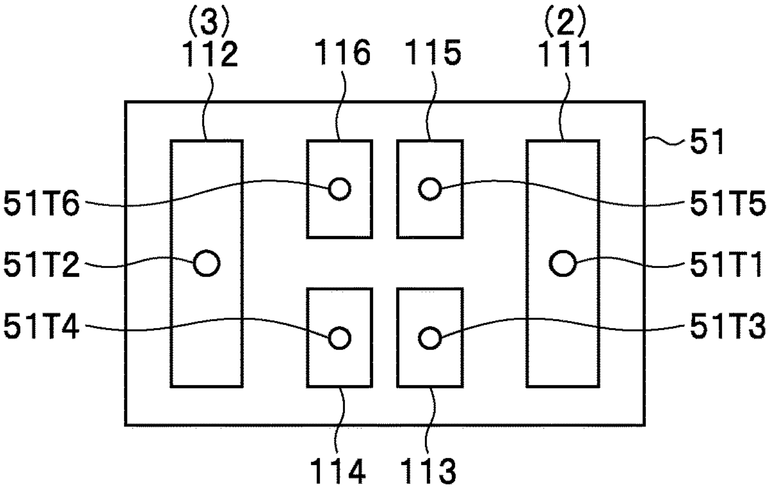
FIG. 3A to FIG. 3C are explanatory diagrams showing respective patterned surfaces of a first to a third dielectric layer of a stack of the filter according to the first embodiment of the present invention.

FIG. 3A shows the patterned surface of the first dielectric layer 51. The terminals 111, 112, 113, 114, 115, and 116 are formed on the patterned surface of the dielectric layer 51. Through holes 51T1, 51T2, 51T3, 51T4, 51T5, and 51T6 connected respectively to the terminals 111, 112, 113, 114, 115, and 116 are formed in the dielectric layer 51.

Figure 3B:
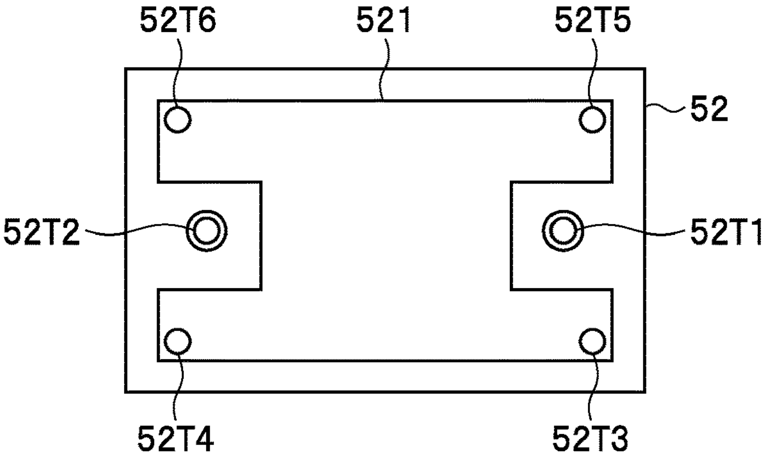

FIG. 3B shows the patterned surface of the second dielectric layer 52. A conductor layer 521 is formed on the patterned surface of the dielectric layer 52. Further, through holes 52T1, 52T2, 52T3, 52T4, 52T5, and 52T6 are formed in the dielectric layer 52. The through holes 51T1 and 51T2 formed in the dielectric layer 51 are connected to the through holes 52T1 and 52T2, respectively. The through holes 51T3 to 51T6 formed in the dielectric layer 51 and the through holes 52T3 to 52T6 are connected to the conductor layer 521.

Figure 3C:
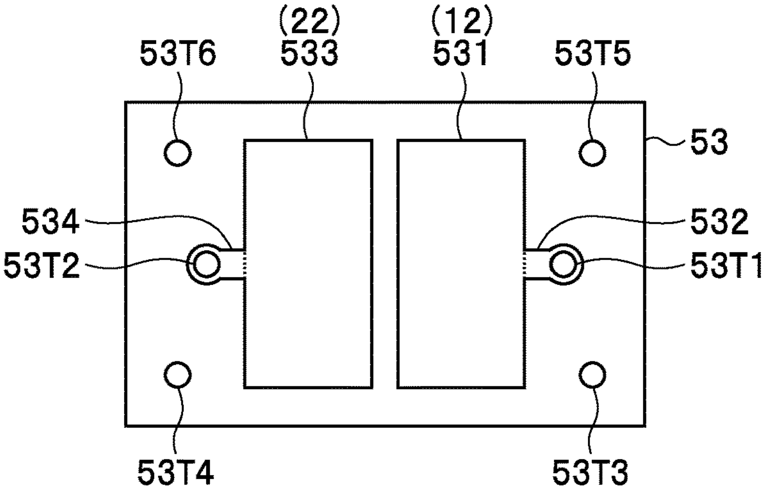

FIG. 3C shows the patterned surface of the third dielectric layer 53. Conductor layers 531, 532, 533, and 534 are formed on the patterned surface of the dielectric layer 53. The conductor layer 532 is connected to the conductor layer 531. The conductor layer 534 is connected to the conductor layer 533. In FIG. 3C, each of the boundary between the conductor layer 531 and the conductor layer 532 and the boundary between the conductor layer 533 and the conductor layer 534 is indicated by a dotted line.

Through holes 53T1, 53T2, 53T3, 53T4, 53T5, and 53T6 are formed in the dielectric layer 53. The through hole 52T1 formed in the dielectric layer 52 and the through hole 53T1 are connected to the conductor layer 532. The through hole 52T2 formed in the dielectric layer 52 and the through hole 53T2 are connected to the conductor layer 534. The through holes 52T3 to 52T6 formed in the dielectric layer 52 are connected to the through holes 53T3 to 53T6, respectively.

Figure 4A:
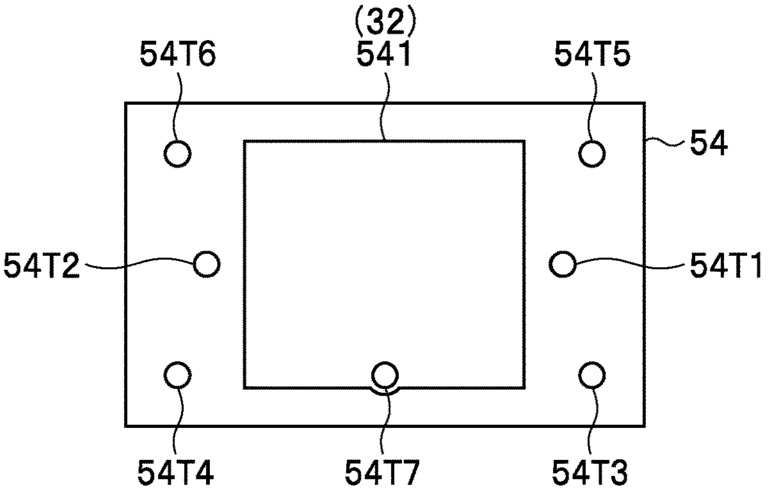
FIG. 4A to FIG. 4C are explanatory diagrams showing respective patterned surfaces of a fourth to a sixth dielectric layer of the stack of the filter according to the first embodiment of the present invention.

FIG. 4A shows the patterned surface of the fourth dielectric layer 54. A conductor layer 541 is formed on the patterned surface of the dielectric layer 54. Through holes 54T1, 54T2, 54T3, 54T4, 54T5, 54T6, and 54T7 are formed in the dielectric layer 54. The through holes 53T1 to 53T6 formed in the dielectric layer 53 are connected to the through holes 54T1 to 54T6, respectively. The through hole 54T7 is connected to the conductor layer 541.

Figure 4B:
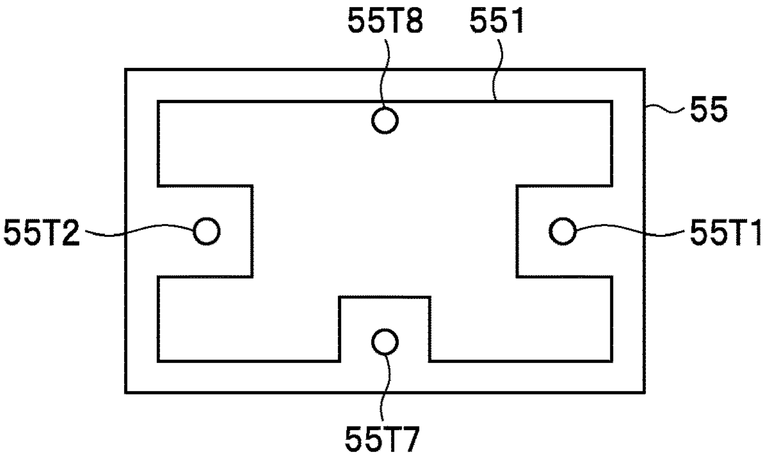

FIG. 4B shows the patterned surface of the fifth dielectric layer 55. A conductor layer 551 is formed on the patterned surface of the dielectric layer 55. Through holes 55T1, 55T2, 55T7, and 55T8 are formed in the dielectric layer 55. The through holes 54T1, 54T2, and 54T7 formed in the dielectric layer 54 are connected to the through holes 55T1, 55T2, and 55T7, respectively. The through holes 54T3 to 54T6 formed in the dielectric layer 54 and the through hole 55T8 are connected to the conductor layer 551.

Figure 4C:
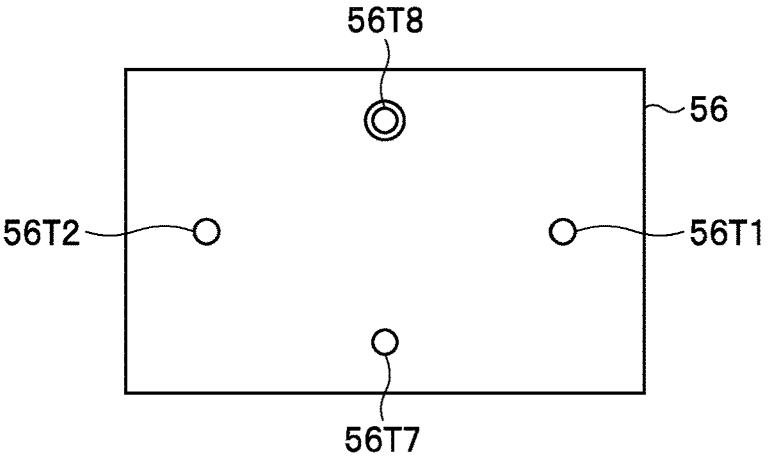

FIG. 4C shows the patterned surface of the sixth dielectric layer 56. Through holes 56T1, 56T2, 56T7, and 56T8 are formed in the dielectric layer 56. The through holes 55T1, 55T2, 55T7, and 55T8 formed in the dielectric layer 55 are connected to the through holes 56T1, 56T2, 56T7, and 56T8, respectively.

Figure 5A:
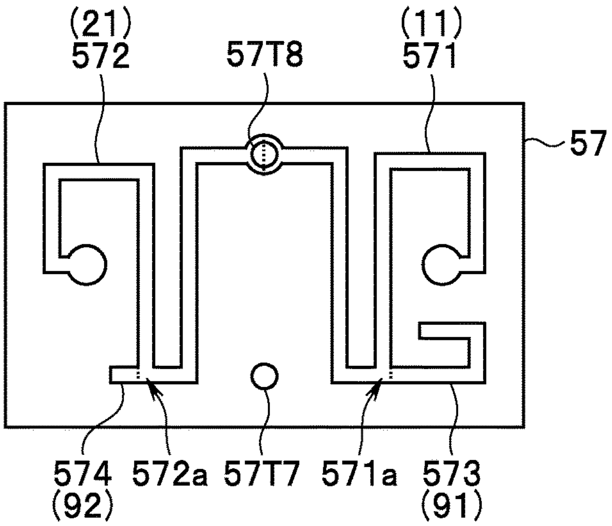
FIG. 5A to FIG. 5C are explanatory diagrams showing respective patterned surfaces of a seventh to a ninth dielectric layer of the stack of the filter according to the first embodiment of the present invention.

FIG. 5A shows the patterned surface of the seventh dielectric layer 57. Conductor layers 571, 572, 573, and 574 are formed on the patterned surface of the dielectric layer 57. Each of the conductor layers 571 and 572 has a first end and a second end opposite to each other. The first end of the conductor layer 571 and the first end of the conductor layer 572 are connected to each other. In FIG. 5A, the boundary between the conductor layer 571 and the conductor layer 572 is indicated by a dotted line. The through hole 56T1 formed in the dielectric layer 56 is connected to a portion near the second end of the conductor layer 571. The through hole 56T2 formed in the dielectric layer 56 is connected to a portion near the second end of the conductor layer 572.

The conductor layer 573 is connected in the middle of the conductor layer 571. The conductor layer 574 is connected in the middle of the conductor layer 572. In FIG. 5A, each of the boundary between the conductor layer 571 and the conductor layer 573 and the boundary between the conductor layer 572 and the conductor layer 574 is indicated by a dotted line.

Through holes 57T7 and 57T8 are formed in the dielectric layer 57. The through hole 56T7 formed in the dielectric layer 56 is connected to the through hole 57T7. The through hole 56T8 formed in the dielectric layer 56 and the through hole 57T8 are connected to a portion near the first end of the conductor layer 571 and a portion near the first end of the conductor layer 572.

Figure 5B:
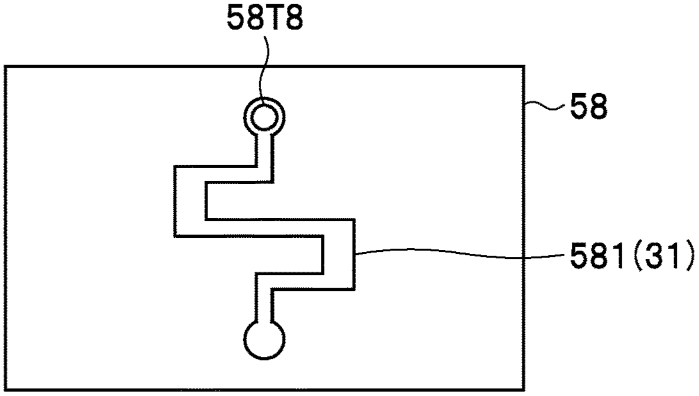

FIG. 5B shows the patterned surface of the eighth dielectric layer 58. A conductor layer 581 is formed on the patterned surface of the dielectric layer 58. The conductor layer 581 has a first end and a second end opposite to each other. The through hole 57T7 formed in the dielectric layer 57 is connected to a portion near the first end of the conductor layer 581.

A through hole 58T8 is formed in the dielectric layer 58. The through hole 57T8 formed in the dielectric layer 57 and the through hole 58T8 are connected to a portion near the second end of the conductor layer 581.

Figure 5C:
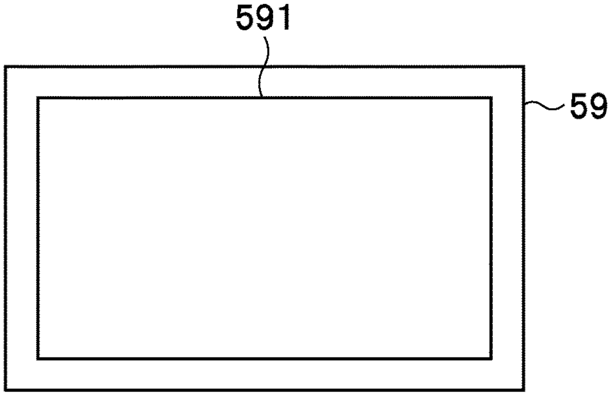

FIG. 5C shows the patterned surface of the ninth dielectric layer 59. A conductor layer 591 is formed on the patterned surface of the dielectric layer 59. The through hole 58T8 formed in the dielectric layer 58 is connected to the conductor layer 591.

The stack 50 shown in FIG. 2 is formed by stacking the first to ninth dielectric layers 51 to 59 such that the patterned surface of the first dielectric layer 51 serves as the first surface 50A of the stack 50 and the surface of the ninth dielectric layer 59 opposite to the patterned surface thereof serves as the second surface 50B of the stack 50.

Figure 6:
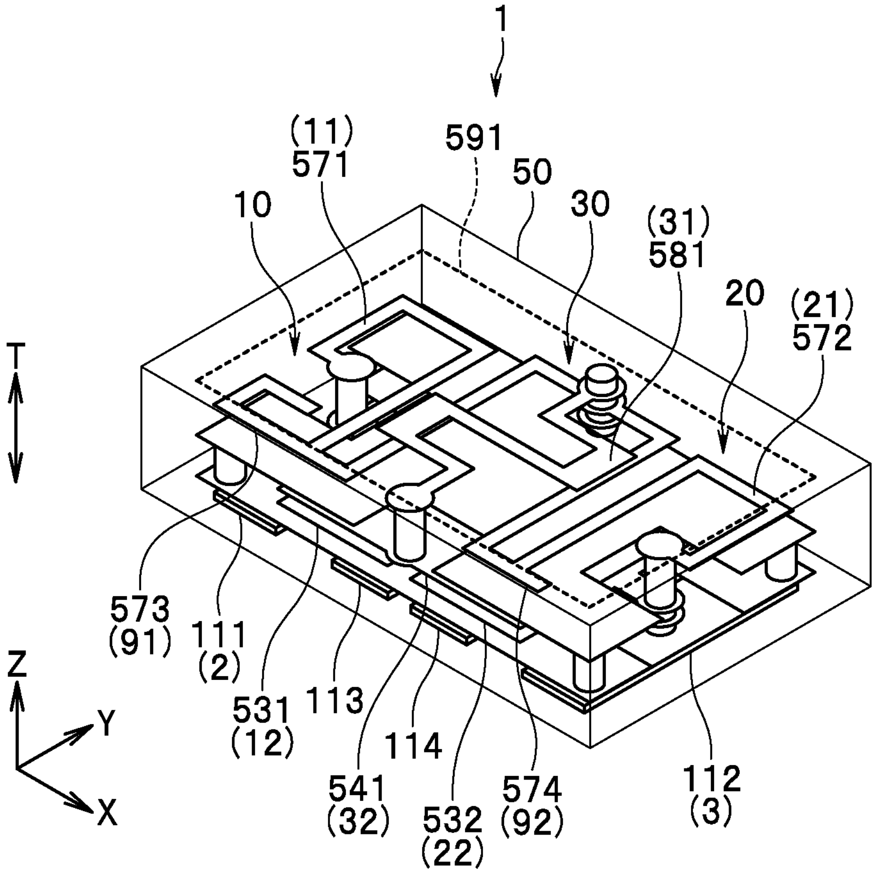
FIG. 6 is a perspective view showing an inside of the stack of the filter according to the first embodiment of the present invention.

FIG. 6 shows the inside of the stack 50 formed by stacking the first to ninth dielectric layers 51 to 59. As shown in FIG. 6, the plurality of conductor layers and the plurality of through holes shown in FIG. 3A to 5C are stacked inside the stack 50.

Correspondences between the circuit components of the filter 1 shown in FIG. 1 and the internal components of the stack 50 shown in FIG. 3A to FIG. 5C will now be described. First, the first resonator 10 will be described. The first conductor part 11 is formed of the conductor layer 571. The second conductor part 12 is formed of the conductor layer 531. The third conductor part 13 is formed of the conductor layer 532.

The conductor layer 532 (third conductor part 13) and the through holes 53T1, 54T1, 55T1, and 56T1 connect the conductor layer 571 forming the first conductor part 11 and the conductor layer 531 forming the second conductor part 12. The conductor layer 571 forming the first conductor part 11 is connected to the ground terminals 113 to 116 via the through holes 51T3 to 51T6, the conductor layer 521, the through holes 52T3 to 52T6 and 53T3 to 53T6, the through holes 54T3 to 54T6, the conductor layer 551, and the through holes 55T8 and 56T8.

Next, the second resonator 20 will be described. The first conductor part 21 is formed of the conductor layer 572. The second conductor part 22 is formed of the conductor layer 533. The third conductor part 23 is formed of the conductor layer 534.

The conductor layer 534 (third conductor part 23) and the through holes 53T2, 54T2, 55T2, and 56T2 connect the conductor layer 572 forming the first conductor part 21 and the conductor layer 533 forming the second conductor part 22. The conductor layer 572 forming the first conductor part 21 is connected to the ground terminals 113 to 116 via the through holes 51T3 to 51T6, the conductor layer 521, the through holes 52T3 to 52T6 and 53T3 to 53T6, the through holes 54T3 to 54T6, the conductor layer 551, and the through holes 55T8 and 56T8.

Next, the third resonator 30 will be described. The first conductor part 31 is formed of the conductor layer 581. The second conductor part 32 is formed of the conductor layer 541.

The conductor layer 581 forming the first conductor part 31 is connected to the ground terminals 113 to 116 via the through holes 51T3 to 51T6, the conductor layer 521, the through holes 52T3 to 52T6 and 53T3 to 53T6, the through holes 54T3 to 54T6, the conductor layer 551, and the through holes 55T8, 56T8, and 57T8.

Next, the first and second stub resonators 91 and 92 will be described. The first stub resonator 91 is formed of the conductor layer 573. The second stub resonator 92 is formed of the conductor layer 574.

Next, the conductor portions 4 and 5 will be described. The conductor portion 4 is formed of the through holes 51T1 and 52T1. The through hole 51T1 is connected to the first terminal 111. The through hole 52T1 is connected to the conductor layer 532 forming the third conductor part 13 and is also connected to the conductor layer 571 forming the first conductor part 11 via the through holes 53T1, 54T1, 55T1, and 56T1.

The conductor portion 5 is formed of the through holes 51T2 and 52T2. The through hole 51T2 is connected to the second terminal 112. The through hole 52T2 is connected to the conductor layer 534 forming the third conductor part 23 and is also connected to the conductor layer 572 forming the first conductor part 21 via the through holes 53T2, 54T2, 55T2, and 56T2.

Figure 7:
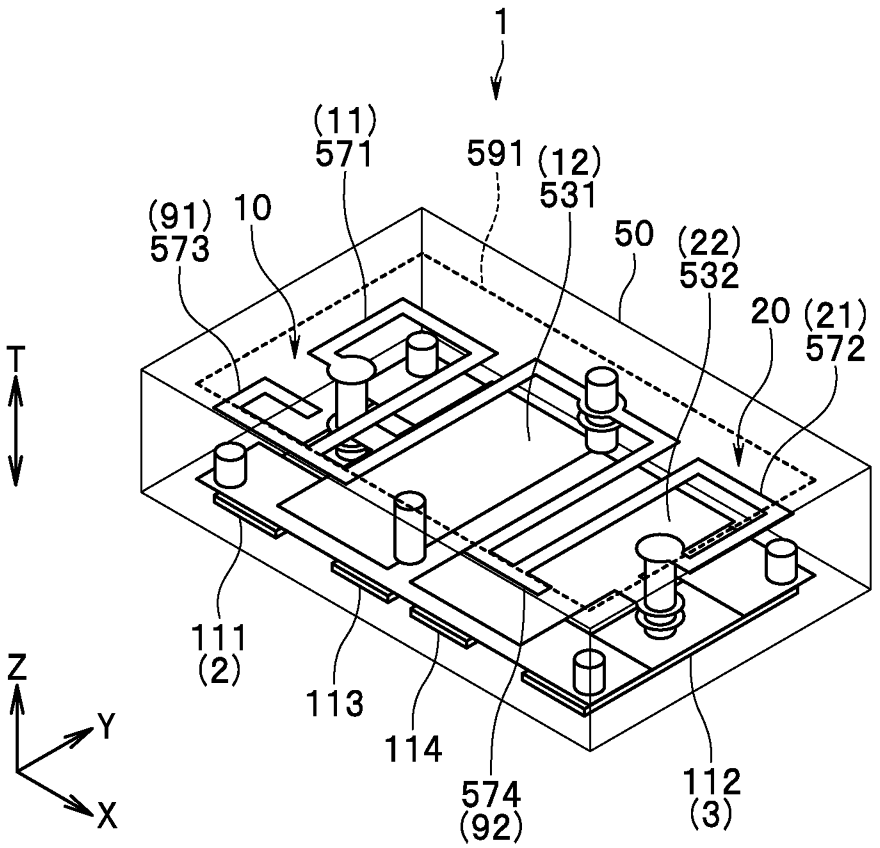
FIG. 7 is a perspective view showing part of the inside of the stack of the filter according to the first embodiment of the present invention.
Figure 8:
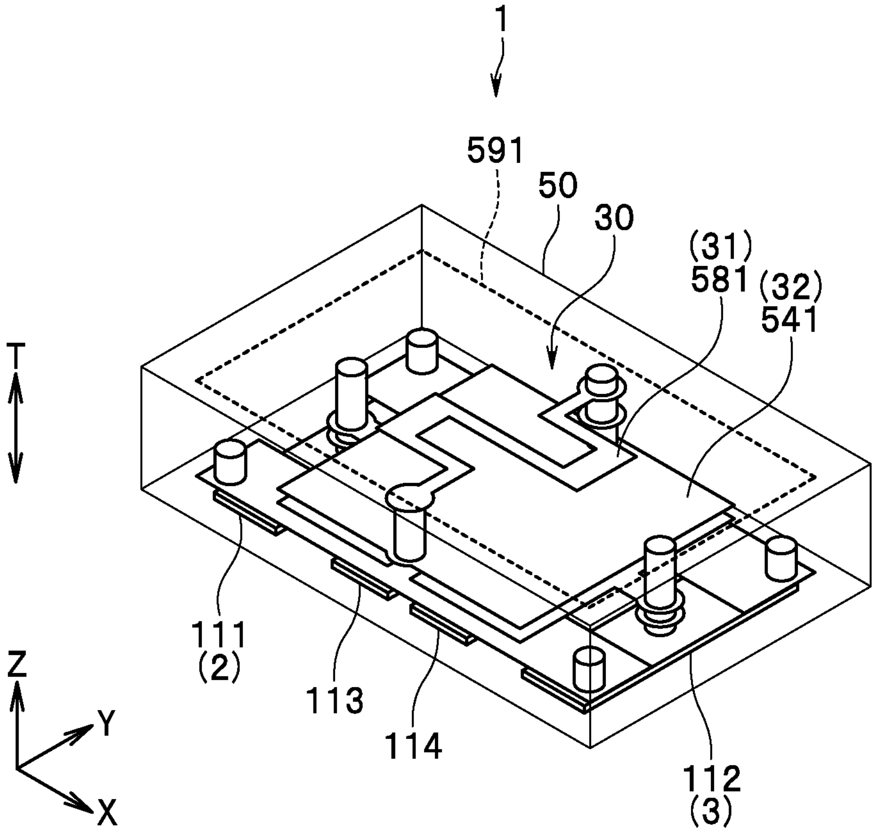
FIG. 8 is a perspective view showing part of the inside of the stack of the filter according to the first embodiment of the present invention.

Next, the structural features of the filter 1 according to the present embodiment will be described with reference to FIG. 2 to FIG. 8. FIG. 7 and FIG. 8 are each a perspective view showing part of an inside of the stack 50. FIG. 7 mainly shows a plurality of conductor layers and a plurality of through holes constituting the first and second resonators 10 and 20 and the first and second stub resonators 91 and 92. FIG. 8 mainly shows a plurality of conductor layers and a plurality of through holes constituting the third resonator 30.

The first resonator 10 is arranged in an area on the –X direction side in the stack 50. In other words, the first resonator 10 is arranged at a position closer to the side surface 50C than the side surface 50D. As shown in FIG. 7, the first conductor part 11 (conductor layer 571) and the second conductor part 12 (conductor layer 531) of the first resonator 10 are arranged at positions different from each other in the stacking direction T. The second conductor part 12 is arranged between the first surface 50A, where the plurality of terminals 111 to 116 are arranged, and the first conductor part 11.

The first conductor part 11 (conductor layer 571) includes a plurality of portions extending in a plurality of directions that are orthogonal to the stacking direction T. In particular, in the present embodiment, the first conductor part 11 (conductor layer 571) includes four portions each extending in a direction parallel to the X direction and three portions each extending in a direction parallel to the Y direction.

The shape of the second conductor part 12 (conductor layer 531) is long in a direction crossing the longitudinal direction of the stack 50. In particular, in the present embodiment, the shape of the second conductor part 12 (conductor layer 531) is a rectangular shape that is long in a direction parallel to the Y direction.

The second resonator 20 is arranged in an area on the X direction side in the stack 50. In other words, the second resonator 20 is arranged at a position closer to the side surface 50D than the side surface 50C. As shown in FIG. 7, the first conductor part 21 (conductor layer 572) and the second conductor part 22 (conductor layer 533) of the second resonator 20 are arranged at positions different from each other in the stacking direction T. The second conductor part 22 is arranged between the first surface 50A, where the plurality of terminals 111 to 116 are arranged, and the first conductor part 21.

The first conductor part 21 (conductor layer 572) includes a plurality of portions extending in a plurality of directions that are orthogonal to the stacking direction T. In particular, in the present embodiment, the first conductor part 21 (conductor layer 572) includes four portions each extending in a direction parallel to the X direction and three portions each extending in a direction parallel to the Y direction.

The shape of the second conductor part 22 (conductor layer 533) is long in a direction crossing the longitudinal direction of the stack 50. In particular, in the present embodiment, the shape of the second conductor part 22 (conductor layer 533) is a rectangular shape that is long in a direction parallel to the Y direction.

At least part of the third resonator 30 is arranged between the first resonator 10 and the second resonator 20 when seen in the Z direction. In particular, in the present embodiment, part of the third resonator 30 is arranged between the first resonator 10 and the second resonator 20.

As shown in FIG. 8, the first conductor part 31 (conductor layer 581) and the second conductor part 32 (conductor layer 541) of the third resonator 30 are arranged at positions different from each other in the stacking direction T. The second conductor part 32 is arranged between the first surface 50A, where the plurality of terminals 111 to 116 are arranged, and the first conductor part 31.

The first conductor part 31 (conductor layer 581) includes a plurality of portions extending in a plurality of directions that are orthogonal to the stacking direction T. In particular, in the present embodiment, the first conductor part 31 (conductor layer 581) includes three portions each extending in a direction parallel to the X direction and four portions each extending in a direction parallel to the Y direction.

The first conductor part 31 (conductor layer 581) has an asymmetrical shape with respect to a given XZ plane crossing the first conductor part 31 and also has an asymmetrical shape with respect to a given YZ plane crossing the first conductor part 31. Hereinafter, the given XZ plane crossing the first conductor part 31 is referred to as a first virtual plane, and the given YZ plane crossing the first conductor part 31 is referred to as a second virtual plane. The first virtual plane may cross the center of the stack 50 in a direction parallel to the Y direction. The second virtual plane may cross the center of the stack 50 in a direction parallel to the X direction.

The shape of the second conductor part 32 (conductor layer 541) is long in the longitudinal direction of the stack 50. In particular, in the present embodiment, the shape of the second conductor part 32 (conductor layer 541) is a rectangular shape that is long in a direction parallel to the X direction.

As shown in FIG. 5A and FIG. 6, the first conductor part 11 (conductor layer 571) of the first resonator 10 and the first conductor part 21 (conductor layer 572) of the second resonator 20 are arranged at the same position in the stacking direction T. As shown in FIG. 5A, FIG. 5B, and FIG. 6, the first conductor part 31 (conductor layer 581) of the third resonator 30 is arranged at a position different from the positions of the first conductor parts 11 and 21 in the stacking direction T. Part of the first conductor part 11 and part of the first conductor part 21 overlap the first conductor part 31 when seen in the Z direction. The shape of the first conductor part 31 is different from the shape of the first conductor part 11 and the shape of the first conductor part 21.

As shown in FIG. 3C and FIG. 6, the second conductor part 12 (conductor layer 531) of the first resonator 10 and the second conductor part 22 (conductor layer 533) of the second resonator 20 are arranged at the same position in the stacking direction T. As shown in FIG. 3C, FIG. 4A, and FIG. 6, the second conductor part 32 (conductor layer 541) of the third resonator 30 is arranged at a position different from the positions of the second conductor parts 12 and 22 in the stacking direction T. Part of the second conductor part 12 and part of the second conductor part 22 overlap the second conductor part 32 when seen in the Z direction. The shape of the second conductor part 32 is different from the shape of the second conductor part 12 and the shape of the second conductor part 22.

As shown in FIG. 5A to FIG. 5C, the shape of the first stub resonator 91 (conductor layer 573) and the shape of the second stub resonator 92 (conductor layer 574) are different from each other. Specifically, the length of the first stub resonator 91 and the length of the second stub resonator 92 are different from each other. In the example shown in FIG. 5A to FIG. 5C, the first stub resonator 91 is longer than the second stub resonator 92. The first stub resonator 91 includes two portions each extending in a direction parallel to the X direction and one portion extending in a direction parallel to the Y direction. The second stub resonator 92 extends in a direction parallel to the X direction. Note that the width of the first stub resonator 91 and the width of the second stub resonator 92 are the same or approximately the same.

The first conductor part 11 of the first resonator 10 includes a first connecting part to which the first stub resonator 91 is connected and a first non-connecting part other than the first connecting part. Specifically, the first connecting part is a portion 571*a* of the conductor layer 571 shown in FIG. 5A near the boundary with the conductor layer 573 indicated by a dotted line. In FIG. 5A, an approximate position of the portion 571*a* is indicated by an arrow. The first non-connecting part is a portion of the conductor layer 571 other than the portion 571*a*.

The current density of the first connecting part (portion 571*a*) in the center frequency of the passband of the filter 1 (band-pass filter) is lower than the current density of the first non-connecting part in the center frequency of the passband of the filter 1 (band-pass filter). In other words, the first stub resonator 91 is connected to or near a portion of the first conductor part 11 with the highest current density.

The first conductor part 21 of the second resonator 20 includes a second connecting part to which the second stub resonator 92 is connected and a second non-connecting part other than the second connecting part. Specifically, the first connecting part is a portion 572*a* of the conductor layer 572 shown in FIG. 5A near the boundary with the conductor layer 574 indicated by a dotted line. In FIG. 5A, an approximate position of the portion 572*a* is indicated by an arrow. The second non-connecting part is a portion of the conductor layer 572 other than the portion 572*a*.

The current density of the second connecting part (portion 572*a*) in the center frequency of the passband of the filter 1 (band-pass filter) is lower than the current density of the second non-connecting part in the center frequency of the passband of the filter 1 (band-pass filter). In other words, the second stub resonator 92 is connected to or near a portion of the first conductor part 21 with the highest current density.

As described above, in the present embodiment, the first conductor part 11 and the second conductor part 12 of the first resonator 10 are arranged at positions different from each other in the stacking direction T. Thus, according to the present embodiment, the first conductor part 11 and the second conductor part 12 can be arranged while overlapping each other. Hence, according to the present embodiment, the area for arranging the first resonator 10 can be made substantially smaller than that for a case where the first conductor part 11 and the second conductor part 12 are formed in the same dielectric layer to be arranged in the same position in the stacking direction T.

The description of the first resonator 10 above is also applicable to the second and third resonators 20 and 30. In view of these, according to the present embodiment, the filter 1 can be miniaturized.

In the present embodiment, part of the first conductor part 11 of the first resonator 10 and part of the first conductor part 21 of the second resonator 20 overlap the first conductor part 31 of the third resonator 30 when seen in the Z direction, and part of the second conductor part 12 of the first resonator 10 and part of the second conductor part 22 of the second resonator 20 overlap the second conductor part 32 of the third resonator 30 when seen in the Z direction. Also in view of this, according to the present embodiment, the filter 1 can be miniaturized.

In the present embodiment, each of the first conductor parts 11, 21, and 31 includes the plurality of portions extending in the plurality of directions different from each other. Hence, according to the present embodiment, the area for arranging each of the first conductor parts 11, 21, and 31 can be made substantially smaller than that for a case where each of the first conductor parts 11, 21, and 31 extends in one direction.

In the present embodiment, the conductor layer 591 is connected to the ground terminals 113 to 116 via the through holes 51T3 to 51T6, the conductor layer 521, the through holes 52T3 to 52T6 and 53T3 to 53T6, the through holes 54T3 to 54T6, the conductor layer 551, and the through holes 55T8, 56T8, 57T8, and 58T8. The first to third resonators 10, 20, and 30 are arranged between the conductor layer 521 and the conductor layer 591. Each of the conductor layers 521 and 591 overlap the first to third resonators 10, 20, and 30 when seen in the Z direction. The conductor layers 521 and 591 function as shields.

In the present embodiment, the impedance of the first conductor part 11 of the first resonator 10 is larger than the impedance of the second conductor part 12 of the first resonator 10. The first stub resonator 91 is electrically connected to the first conductor part 11 having a large impedance. In particular, in the present embodiment, the first stub resonator 91 is connected to the portion of the first conductor part 11 with the highest current density. Thus, according to the present embodiment, it is possible to control spurious while suppressing an influence of the first stub resonator 91 to the basic resonance of the first resonator 10.

The description of the first resonator 10 and the first stub resonator 91 above is also applicable to the second resonator 20 and the second stub resonator 92. According to the present embodiment, it is possible to control spurious while suppressing an influence of the second stub resonator 92 to the basic resonance of the second resonator 20.

Figure 9:
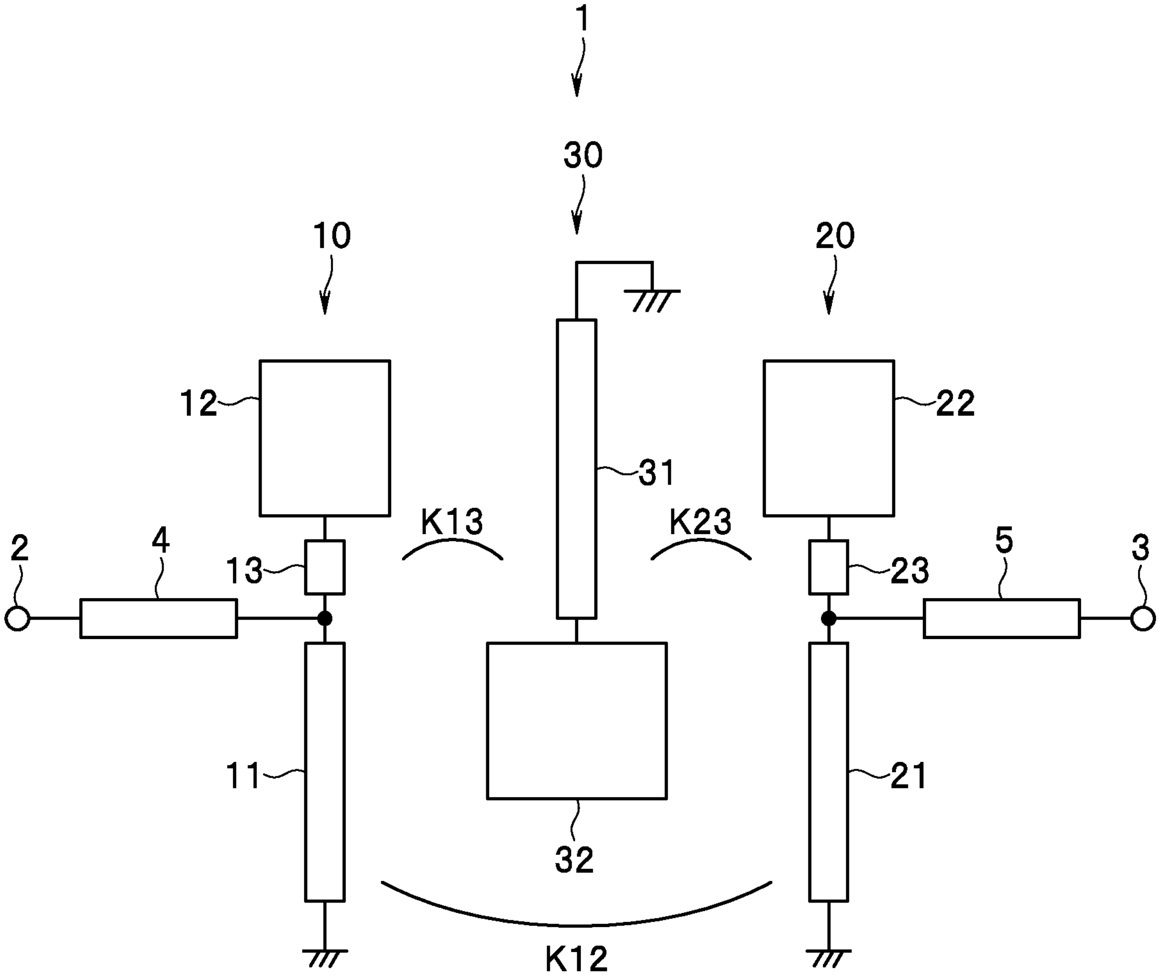
FIG. 9 RELATED ART
FIG. 9 is a circuit diagram showing a circuit configuration of a filter of a first comparative example.
Figure 10:
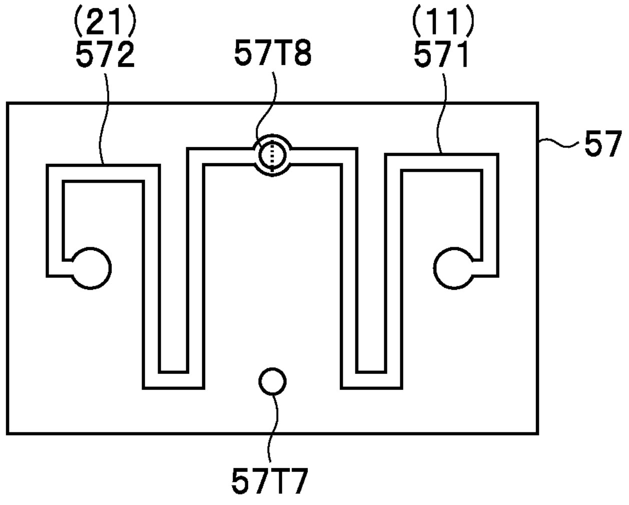
FIG. 10 RELATED ART
FIG. 10 is an explanatory diagram showing a patterned surface of a seventh dielectric layer of a stack of the filter of the first comparative example.

Next, a description will be given of results of a first simulation indicating that the absolute value of attenuation (hereinafter referred to as pass attenuation) can be increased in a wide frequency band on a high-frequency side of the passband by the first and second stub resonators 91 and 92. First, models of first to third comparative examples and a model of a practical example used in the first simulation will be described. The model of the first comparative example is a model of a filter of the first comparative example. FIG. 9 is a circuit diagram showing a circuit configuration of the filter of the first comparative example. FIG. 10 is an explanatory diagram showing a patterned surface of a seventh dielectric layer of a stack of the filter of the first comparative example. A configuration of the filter of the first comparative example is almost the same as the configuration of the filter 1 according to the present embodiment except that the first and second stub resonators 91 and 92 and the conductor layers 573 and 574 formed on the dielectric layer 57 of the stack 50 are not provided.

Figure 11:
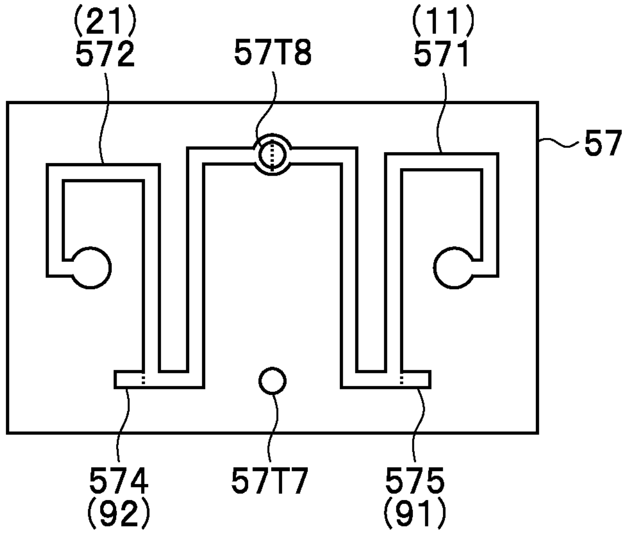
FIG. 11 RELATED ART
FIG. 11 is an explanatory diagram showing a patterned surface of a seventh dielectric layer of a stack of a filter of a second comparative example.

The model of the second comparative example is a model of a filter of the second comparative example. FIG. 11 is an explanatory diagram showing a patterned surface of the seventh dielectric layer 57 of the stack 50 of the filter of the second comparative example. In the filter of the second comparative example, a conductor layer 575 is formed on the dielectric layer 57 instead of the conductor layer 573 of the present embodiment. In FIG. 11, the boundary between the conductor layer 571 and the conductor layer 575 is indicated by a dotted line. In the filter according to the second comparative example, the first stub resonator 91 is formed of the conductor layer 575. Other configurations of the filter of the second comparative example are the same as the configurations of the filter 1 according to the present embodiment.

In particular, in the model of the second comparative example, the shape of the first stub resonator 91 (conductor layer 575) is the same as the shape of the second stub resonator 92 (conductor layer 574). In other words, the first stub resonator 91 extends in a direction parallel to the X direction.

Figure 12:
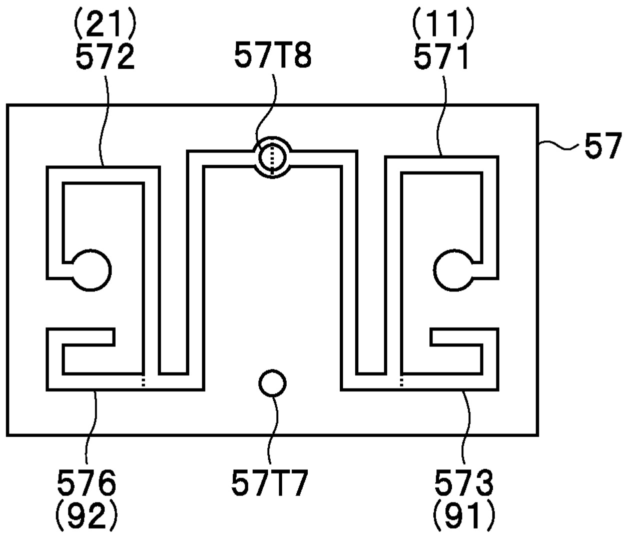
FIG. 12 RELATED ART
FIG. 12 is an explanatory diagram showing a patterned surface of a seventh dielectric layer of a stack of a filter of a third comparative example.

The model of the third comparative example is a model of a filter according to the third comparative example. FIG. 12 is an explanatory diagram showing a patterned surface of the seventh dielectric layer 57 of the stack 50 of the filter of the third comparative example. In the filter of the third comparative example, a conductor layer 576 is formed in the dielectric layer 57 instead of the conductor layer 574 of the present embodiment. In FIG. 12, the boundary between the conductor layer 572 and the conductor layer 576 is indicated by a dotted line. In the filter of the third comparative example, the second stub resonator 92 is formed of the conductor layer 576. Other configurations of the filter of the third comparative example are the same as the configurations of the filter 1 according to the present embodiment.

In particular, in the model of the third comparative example, the shape of the second stub resonator 92 (conductor layer 576) is the same as the shape of the first stub resonator 91 (conductor layer 573). In other words, the second stub resonator 92 includes two portions each extending in a direction parallel to the X direction and one portion extending in a direction parallel to the Y direction.

The model of the practical example is a model of the filter 1 according to the present embodiment. In the simulation, in each of the models of the first to third comparative examples and the model of the practical example, the impedance ratio in each of the first and second resonators 10 and 20 was set to 0.106, and the impedance ratio in the third resonator 30 was set to 0.094.

In the first simulation, each of the models of the first to third comparative examples and the model of the practical example was designed to function as a band-pass filter. Under these conditions, pass attenuation characteristics of each of the models of the comparative examples and the model of the practical example were determined.

Figure 13:
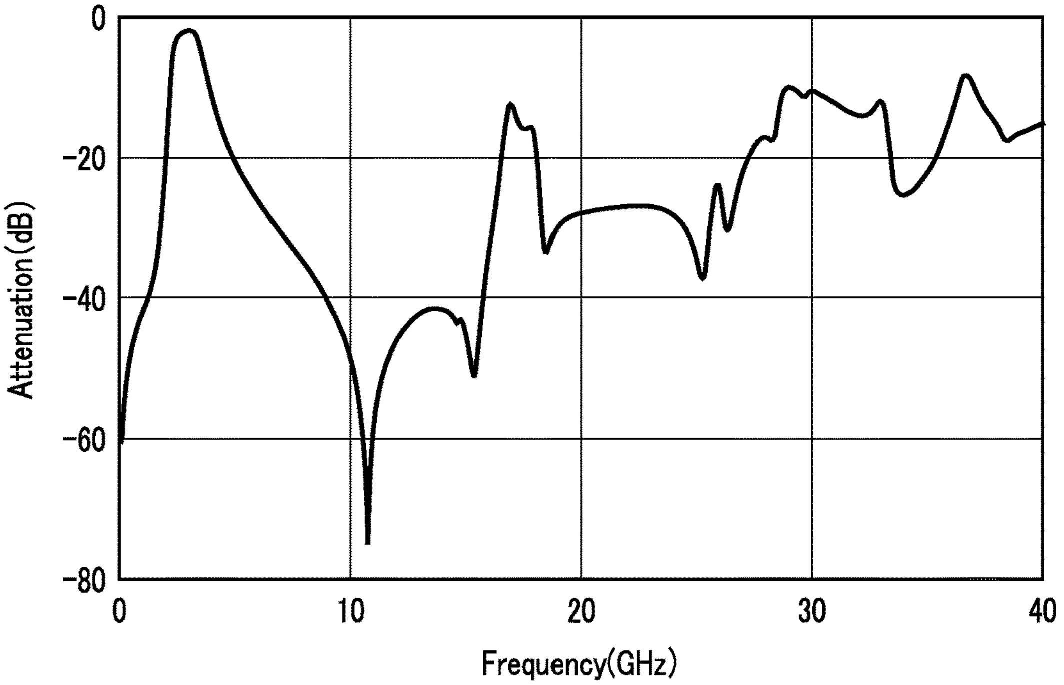
FIG. 13 RELATED ART
FIG. 13 is a characteristic chart showing pass attenuation characteristics of a model of the first comparative example.
Figure 14:
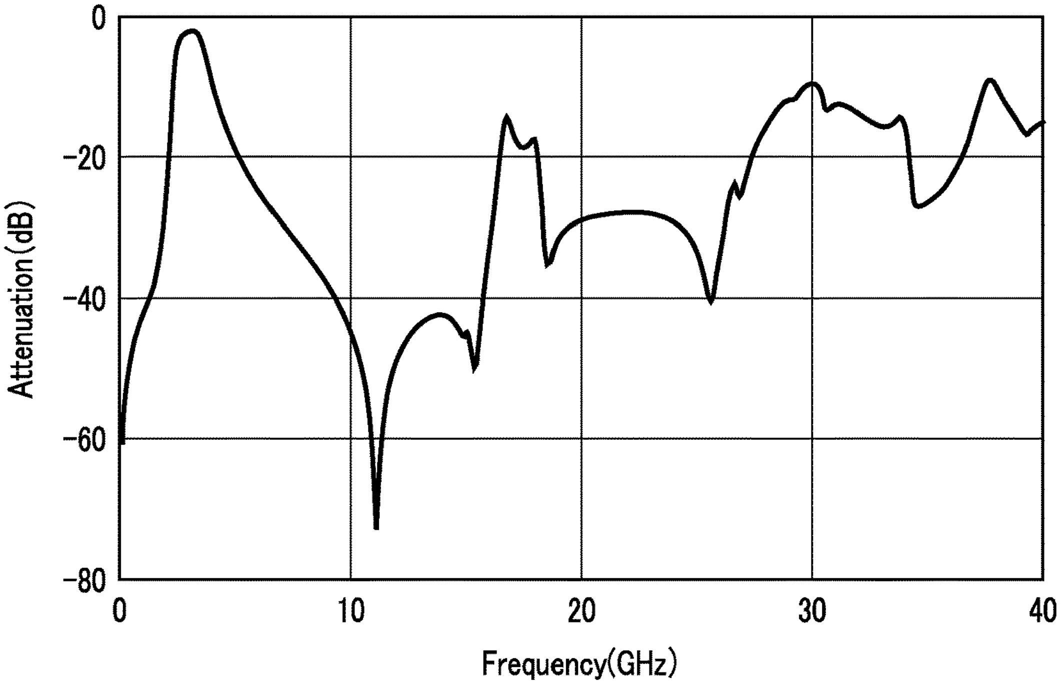
FIG. 14 RELATED ART
FIG. 14 is a characteristic chart showing pass attenuation characteristics of a model of the second comparative example.
Figure 15:
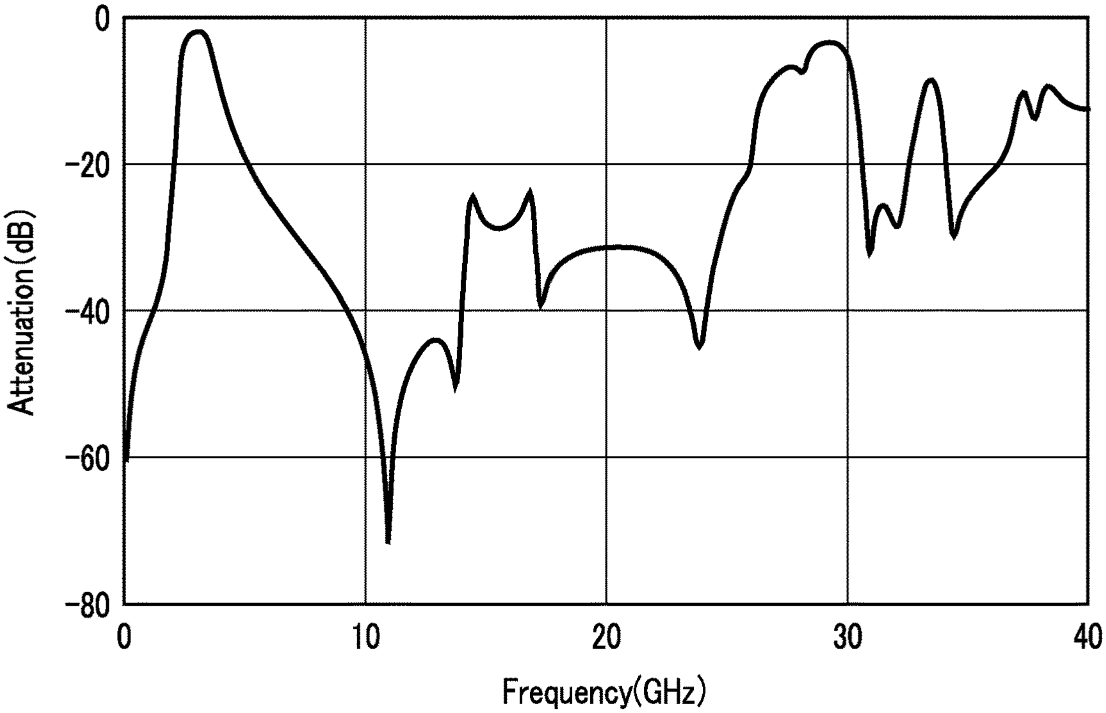
FIG. 15 RELATED ART
FIG. 15 is a characteristic chart showing pass attenuation characteristics of a model of the third comparative example.
Figure 16:
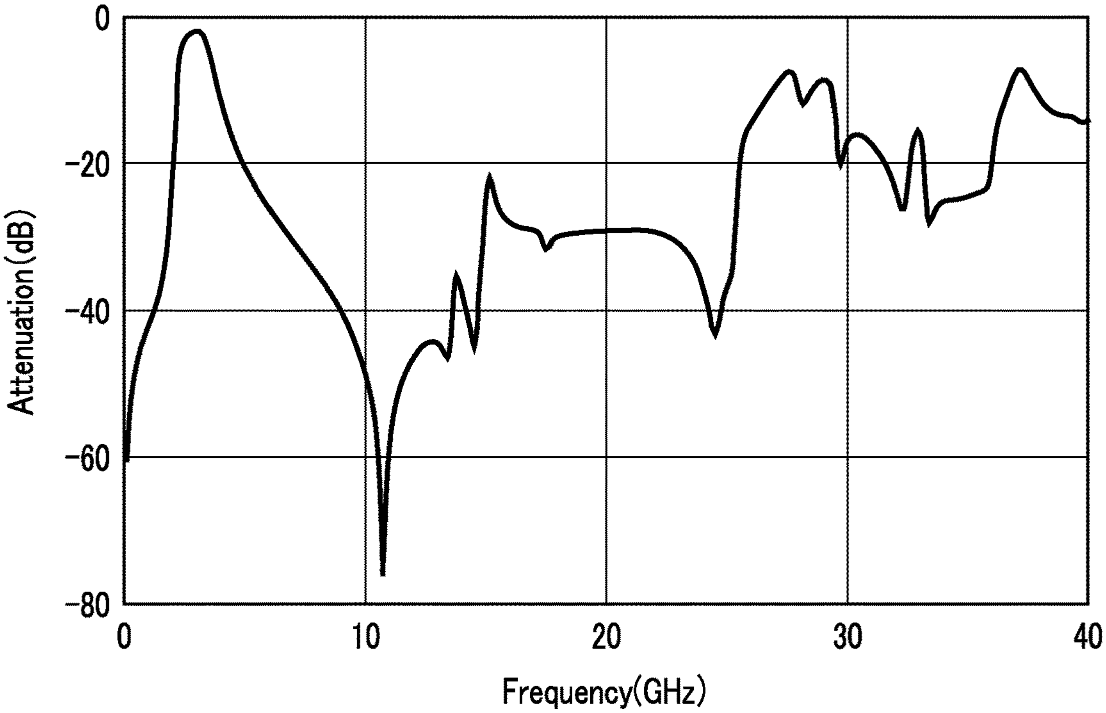
FIG. 16 is a characteristic chart showing pass attenuation characteristics of a model of a practical example.

FIG. 13 is a characteristic chart showing pass attenuation characteristics of the model of the first comparative example. FIG. 14 is a characteristic chart showing pass attenuation characteristics of the model of the second comparative example. FIG. 15 is a characteristic chart showing pass attenuation characteristics of the model of the third comparative example. FIG. 16 is a characteristic chart showing pass attenuation characteristics of the model of the practical example. In each of FIG. 13 to FIG. 16, the horizontal axis represents frequency, and the vertical axis represents attenuation.

As shown in FIG. 13 to FIG. 16, a plurality of spurious components are generated on the high-frequency side of the passband in all the models of the first to third comparative examples and the model of the practical example. The frequencies of the plurality of spurious components are different from each other among the models of the first to third comparative examples and the model of the practical example. As described above, in the model of the first comparative example, the first and second stub resonators 91 and 92 are not provided. Among the models of the second and third comparative examples and the model of the practical example, the shapes of the first and second stub resonators 91 and 92 are different from each other. The results of the first simulation shown in FIG. 13 to FIG. 16 indicate that a plurality of spurious components can be controlled with the first and second stub resonators 91 and 92.

When the model of the first comparative example (FIG. 13) and the model of the second comparative example (FIG. 14) are compared with each other, the peak where the pass attenuation is relatively low is present in a band having frequencies of 17 GHz to 18 GHz in both the model of the first comparative example and the model of the second comparative example. In the model of the second comparative example, the smallest value of the pass attenuation at the peak is slightly greater than that of the model of the first comparative example.

In the model of the third comparative example (FIG. 15), the peak where the pass attenuation is relatively low is present in a band having frequencies of 14 GHz to 18 GHz. In terms of a frequency band at the peak described above and near the peak for each of the models of the first to third comparative examples, the pass attenuation is higher in the model of the third comparative example than those of the models of the first and second comparative examples. In contrast, in terms of the band having frequencies of 24 GHz to 31 GHz for each of the models of the first to third comparative examples, the pass attenuation is lower in the model of the third comparative example than those of the models of the first and second comparative examples.

In the model of the practical example (FIG. 16), the peak where the pass attenuation is relatively low is present in a band having frequencies of 14 GHz to 16 GHz. In terms of a frequency band at the peak described above and near the peak for each of the models of the first and second comparative examples and the model of the practical example, the pass attenuation is higher in the model of the practical example than those of the models of the first and second comparative examples. In terms of the band having frequencies of 27 GHz to 31 GHz for each of the model of the third comparative example and the model of the practical example, the pass attenuation is lower in the model of the practical example than that of the model of the third comparative example.

As understood from the results of the first simulation shown in FIG. 13 to FIG. 16, spurious to be generated on the high-frequency side of the passband can be controlled with the first and second stub resonators 91 and 92 according to the present embodiment. As understood from the results of the first simulation shown in FIG. 14 to FIG. 16, by the shape of the first stub resonator 91 and the shape of the second stub resonator 92 being made different from each other, the pass attenuation can be increased in a wide frequency band on the high-frequency side of the passband according to the present embodiment.

Next, a description will be given of results of a second simulation indicating that the pass attenuation (the absolute value of attenuation) can be increased on the high-frequency side of the passband, based on the shape of the first conductor part 31 of the third resonator 30. First, a model of a fourth comparative example used in the second simulation will be described. The model of the fourth comparative example is a model of a filter of the fourth comparative example.

Figure 17:
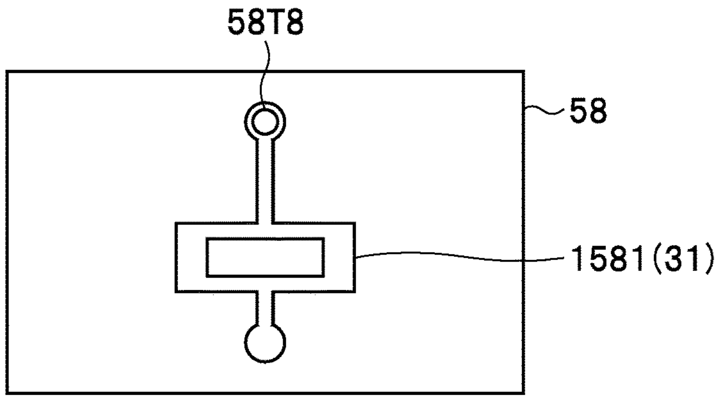
FIG. 17 RELATED ART
FIG. 17 is an explanatory diagram showing a patterned surface of an eighth dielectric layer of a stack of a filter of a fourth comparative example.

FIG. 17 is an explanatory diagram showing a patterned surface of an eighth dielectric layer of a stack of the filter of the fourth comparative example. In the filter of the fourth comparative example, a conductor layer 1581 is formed in the eighth dielectric layer 58 instead of the conductor layer 581 of the present embodiment. In the filter of the fourth comparative example, the first conductor part 31 of the third resonator 30 is formed of the conductor layer 1581 shown in FIG. 17. In the filter of the fourth comparative example, the first conductor part 31 (conductor layer 1581) has a shape symmetrical with respect to a YZ plane crossing the center of the stack 50 in a direction parallel to the X direction. Other configurations of the filter of the fourth comparative example are approximately the same as the configurations of the filter 1 according to the present embodiment.

Figure 18:
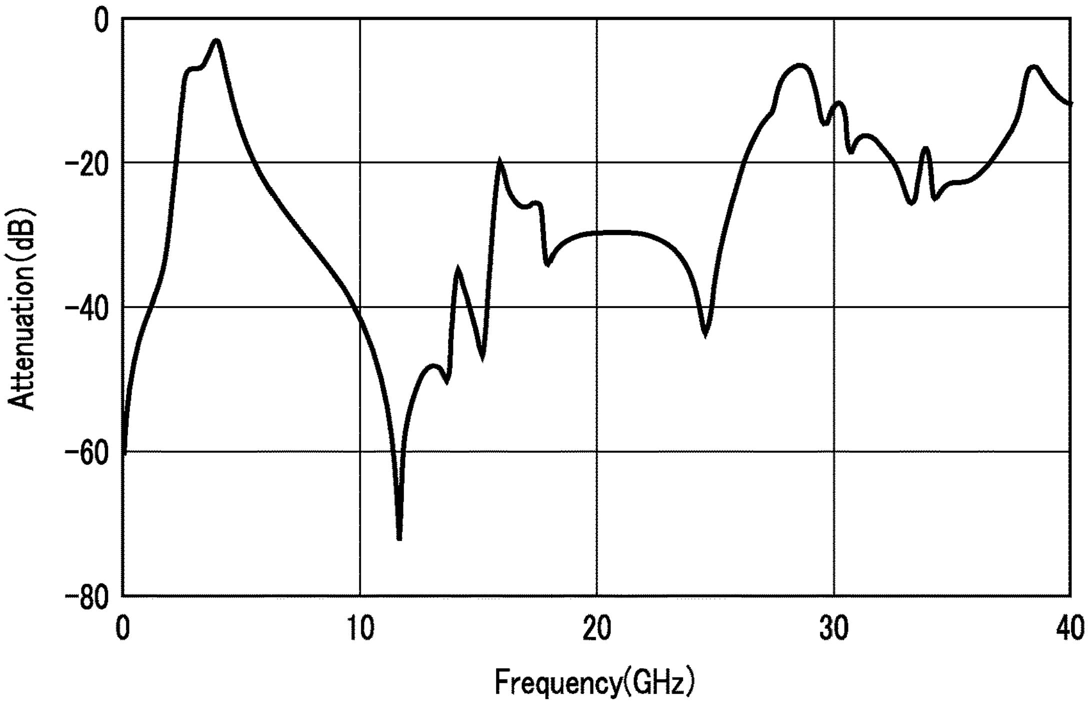
FIG. 18 RELATED ART
FIG. 18 is a characteristic chart showing pass attenuation characteristics of a model of the fourth comparative example.

FIG. 18 is a characteristic chart showing pass attenuation characteristics of the model of the fourth comparative example. In FIG. 18, the horizontal axis represents frequency, and the vertical axis represents attenuation. In the model of the fourth comparative example, the peak where the pass attenuation is relatively low is present in a band having frequencies of 15 GHz to 18 GHz. In terms of a frequency band at the peak described above and near the peak for each of the model of the fourth comparative example and the model of the practical example (refer to FIG. 16), the pass attenuation is lower in the model of the fourth comparative example than that of the practical example.

As described above, in the present embodiment, the first conductor part 31 (conductor layer 581) has an asymmetrical shape. As understood from the results of the second simulation, by the first conductor part 31 having an asymmetrical shape, the pass attenuation can be increased on the high-frequency side of the passband according to the present embodiment.

Second Embodiment

Figure 19:
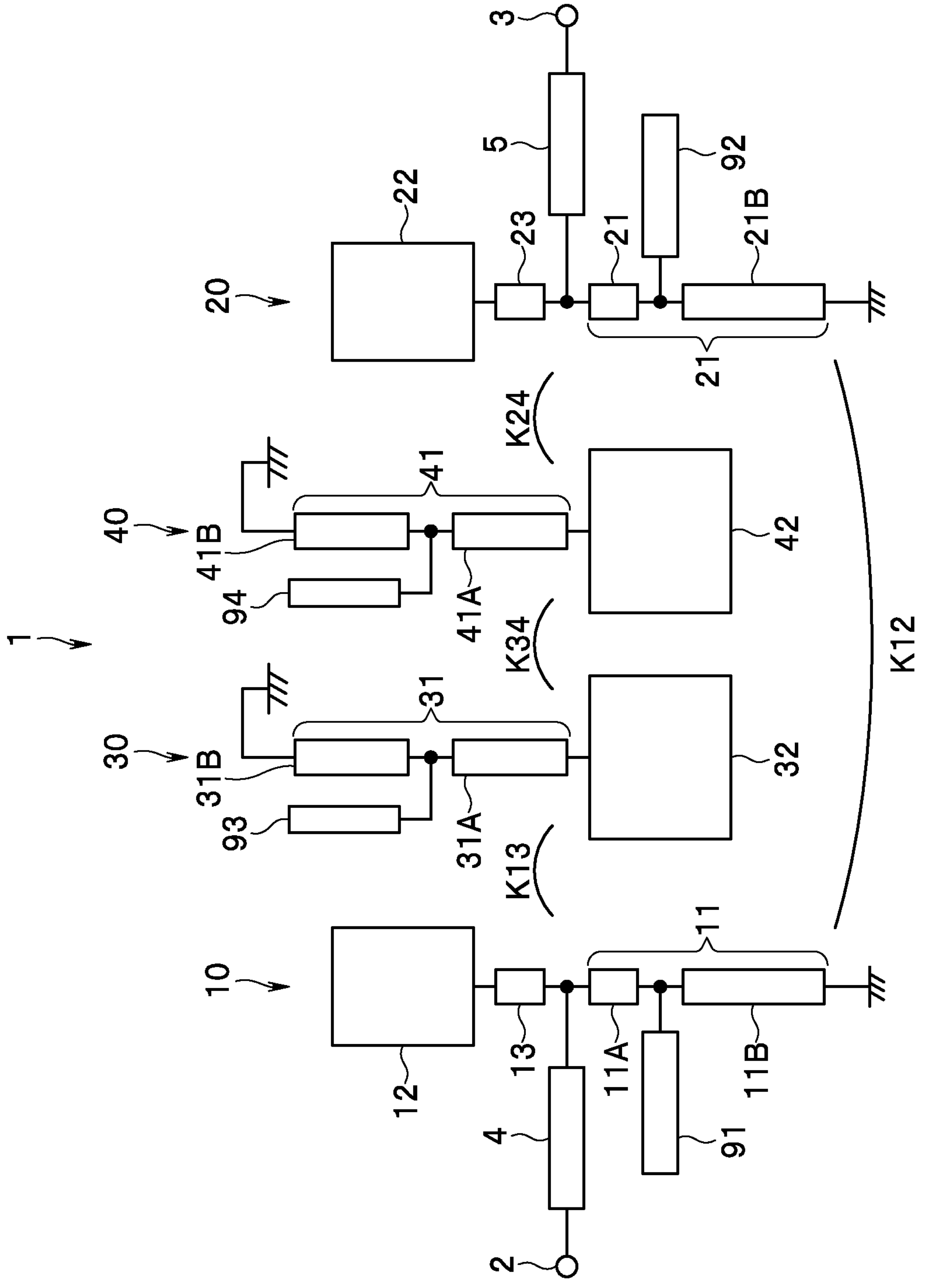
FIG. 19 is a circuit diagram showing a circuit configuration of a filter according to a second embodiment of the present invention.

A description will be made on a second embodiment of the present invention with reference to FIG. 19. FIG. 19 is a circuit diagram showing a circuit configuration of a filter according to the present embodiment.

A filter 1 according to the present embodiment differs from that of the first embodiment in the following respects. The filter 1 according to the present embodiment includes a fourth resonator 40. The fourth resonator 40 is arranged between the second resonator 20 and the third resonator 30 in the circuit configuration. In the present embodiment, the first to fourth resonators 10, 20, 30, and 40 are configured so that the first resonator 10 and the third resonator 30 are adjacent to each other in the circuit configuration to be electromagnetically coupled to each other, the third resonator 30 and the fourth resonator 40 are adjacent to each other in the circuit configuration to be electromagnetically coupled to each other, and the second resonator 20 and the fourth resonator 40 are adjacent to each other in the circuit configuration to be electromagnetically coupled to each other. In FIG. 19, a curve with a sign K13 represents electric field coupling between the first resonator 10 and the third resonator 30, a curve with a sign K34 represents magnetic field coupling between the third resonator 30 and the fourth resonator 40, and a curve with a sign K24 represents electric field coupling between the second resonator 20 and the fourth resonator 40.

A configuration of the fourth resonator 40 is basically the same as the configuration of the third resonator 30. Specifically, the fourth resonator 40 includes a first conductor part 41 and a second conductor part 42 having an impedance smaller than that of the first conductor part 41. The first conductor part 41 and the second conductor part 42 are electrically connected to each other. The first conductor part 41 is connected to ground. Each of the first conductor part 41 and the second conductor part 42 is a distributed constant line. In particular, in the present embodiment, the first conductor part 41 is a distributed constant line having a small width, and the second conductor part 42 is a distributed constant line having a width larger than that of the first conductor part 41.

The fourth resonator 40, similarly to the first to third resonators 10, 20, and 30, is a stepped-impedance resonator composed of a distributed constant line having a small width and a distributed constant line having a large width.

Although not shown, the first conductor part 41 and the second conductor part 42 of the fourth resonator 40, similarly to the first conductor part 31 and the second conductor part 32 of the third resonator 30, are arranged at positions different from each other in the stacking direction T. The first conductor part 31 and the first conductor part 41 may be arranged at the same position in the stacking direction T or may be arranged at positions different from each other in the stacking direction T. Similarly, the second conductor part 32 and the second conductor part 42 may be arranged at the same position in the stacking direction T or may be arranged at positions different from each other in the stacking direction T.

In the present embodiment, at least part of the third resonator 30 and at least part of the fourth resonator 40 are arranged between the first resonator 10 and the second resonator 20 when seen in the Z direction (refer to FIG. 2).

In the present embodiment, part of the first conductor part 11 of the first resonator 10 may overlap the first conductor part 31 of the third resonator 30 when seen in the Z direction. In this case, part of the first conductor part 21 of the second resonator 20 may overlap the first conductor part 41 of the fourth resonator 40 when seen in the Z direction.

In the present embodiment, part of the second conductor part 12 of the first resonator 10 may overlap the second conductor part 32 of the third resonator 30 when seen in the Z direction. In this case, part of the second conductor part 22 of the second resonator 20 may overlap the second conductor part 42 of the fourth resonator 40 when seen in the Z direction.

The filter 1 according to the present embodiment further includes a third stub resonator 93 electrically connected to the first conductor part 31 of the third resonator 30, and a fourth stub resonator 94 electrically connected to the first conductor part 41 of the fourth resonator 40. Each of the third and fourth stub resonators 93 and 94 is a distributed constant line.

The third stub resonator 93 is connected in the middle of the first conductor part 31. In FIG. 19, for the first conductor part 31, a portion located between a connecting point with the third stub resonator 93 and the second conductor part 32 in the circuit configuration is indicated by a reference numeral 31A, and a portion located between a connecting point with the third stub resonator 93 and the ground in the circuit configuration is indicated by a reference numeral 31B.

The fourth stub resonator 94 is connected in the middle of the first conductor part 41. In FIG. 19, for the first conductor part 41, a portion located between a connecting point with the fourth stub resonator 94 and the second conductor part 42 in the circuit configuration is indicated by a reference numeral 41A, and a portion located between a connecting point with the fourth stub resonator 94 and the ground in the circuit configuration is indicated by a reference numeral 41B.

The third and fourth stub resonators 93 and 94 are used, for example, to control spurious to be generated in a higher frequency region than a passband. Each of the third and fourth stub resonators 93 and 94 may be an open stub with one end being open or may be a short stub with one end being connected to ground.

The configuration, operation, and effects of the present embodiment are otherwise the same as those of the first embodiment.

The present invention is not limited to the foregoing embodiments, and various modifications may be made thereto. For example, the number and configuration of resonators are not limited to those shown in the embodiments, and any number and configuration of resonators may be employed as long as the scope of the claims is satisfied. The number of resonators may be one, two, or five or more.

Obviously, many modifications and variations of the present invention are possible in the light of the above teachings. Thus, it is to be understood that, within the scope of the appended claims and equivalents thereof, the invention may be practiced in other embodiments than the foregoing most preferable embodiments.

What is claimed is:

1. A filter comprising:

a first resonator and a second resonator each including a first conductor part and a second conductor part having an impedance smaller than an impedance of the first conductor part;

a first stub resonator composed of a distributed constant line that is electrically and directly connected to the first conductor part of the first resonator; and a second stub resonator composed of a distributed constant line that is electrically and directly connected to the first conductor part of the second resonator, wherein a shape of the first stub resonator and a shape of the second stub resonator are different from each other.

2. The filter according to claim 1, wherein a length of the first stub resonator and a length of the second stub resonator are different from each other.

3. The filter according to claim 1, wherein each of the first conductor part and the second conductor part is a distributed constant line.

4. The filter according to claim 1, wherein the filter is a band-pass filter that selectively allows a signal of a frequency in a predetermined passband to pass.

5. The filter according to claim 4, wherein the first conductor part of the first resonator includes a first connecting part to which the first stub resonator is connected and a first non-connecting part other than the first connecting part, the first conductor part of the second resonator includes a second connecting part to which the second stub resonator is connected and a second non-connecting part other than the second connecting part, current density of the first connecting part in a center frequency of the passband is higher than current density of the first non-connecting part in the center frequency of the passband, and current density of the second connecting part in the center frequency of the passband is higher than current density of the second non-connecting part in the center frequency of the passband.

6. The filter according to claim 1, wherein an impedance ratio being a ratio of an impedance of the second conductor part to an impedance of the first conductor part in each of the first resonator and the second resonator is 0.3 or smaller.

7. The filter according to claim 1, wherein each of the first conductor part of the first resonator and the first conductor part of the second resonator includes a plurality of portions extending in a plurality of directions different from each other.

8. The filter according to claim 1, further comprising a stack including a plurality of dielectric layers stacked together, wherein the first resonator, the second resonator, the first stub resonator, and the second stub resonator are integrated with the stack.

9. The filter according to claim 8, wherein the first conductor part of the first resonator and the second conductor part of the first resonator are arranged at positions different from each other in a stacking direction of the plurality of dielectric layers and electrically connected to each other, and the first conductor part of the second resonator and the second conductor part of the second resonator are arranged at positions different from each other in the stacking direction of the plurality of dielectric layers and electrically connected to each other.

10. The filter according to claim 9, further comprising a plurality of through holes connecting the first conductor part and the second conductor part in each of the first resonator and the second resonator.

11. The filter according to claim 9, wherein the first conductor part of the first resonator and the first conductor part of the second resonator are arranged at a same position in the stacking direction.

12. The filter according to claim 9, wherein the second conductor part of the first resonator and the second conductor part of the second resonator are arranged at a same position in the stacking direction.

13. The filter according to claim 1, further comprising a third resonator arranged between the first resonator and the second resonator in a circuit configuration.

14. The filter according to claim 13, wherein the third resonator includes a third conductor part and a fourth conductor part having an impedance smaller than an impedance of the third conductor part, and the third conductor part has an asymmetrical shape.

* * * * *